(12) United States Patent
Freisinger et al.

(10) Patent No.: US 7,892,307 B2
(45) Date of Patent: Feb. 22, 2011

(54) COMPACT FILTER

(75) Inventors: Juergen Freisinger, Affalterbach (DE); Mario Rieger, Freiberg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 286 days.

(21) Appl. No.: 12/178,958

(22) Filed: Jul. 24, 2008

(65) Prior Publication Data
US 2009/0188220 A1  Jul. 30, 2009

(30) Foreign Application Priority Data
Jul. 27, 2007  (DE) .................. 20 2007 010 601 U

(51) Int. Cl.
*B01D 50/00* (2006.01)
(52) U.S. Cl. .................. 55/385.3; 55/418; 55/496; 55/521; 96/385; 96/386
(58) Field of Classification Search ............... 55/385.3, 55/418, 496, 521; 96/385, 386
See application file for complete search history.

(56) References Cited

U.S. PATENT DOCUMENTS 5,106,397 A   4/1992   Jaroszczyk

FOREIGN PATENT DOCUMENTS

| DE | 19709834 | 10/1967 |
|---|---|---|
| DE | 8708814 | 8/1987 |
| DE | 29613098 | 9/1996 |
| DE | 29714886 | 10/1997 |
| EP | 861671 A2 * | 9/1998 |
| FR | 1563990 A | 4/1969 |
| WO | WO97/40908 A | 11/1997 |
| WO | WO99/33544 A | 7/1999 |

OTHER PUBLICATIONS

German patent office search report of DE 20 2007 010 601.7, Nov. 14, 2008.

* cited by examiner

*Primary Examiner*—Robert A Hopkins

(57) ABSTRACT

A compact filter has a filter housing and a compact filter element that is arranged in the filter housing, wherein the filter element is exchangeable. The compact filter element has a filter body having a longitudinal axis. The compact filter element has an unfiltered air side and a filtered air side. A baffle element is arranged at the unfiltered air side of the compact filter element. The baffle element is removable together with the filter element from the filter housing and has at least one baffle surface that is slanted relative to the longitudinal axis.

13 Claims, 2 Drawing Sheets ium, 2007, the entire disclosure of which is incorporated herein by reference.

COMPACT FILTER

CROSS REFERENCE TO RELATED APPLICATIONS

This application claims priority to Federal Republic of Germany patent application no. DE 202007010601.7, filed Jul. 27, 2007, the entire disclosure of which is incorporated herein by reference.

BACKGROUND OF THE INVENTION

The invention relates to a compact filter, in particular, a compact air filter for motor vehicles. The compact filter comprises a compact filter element that is arranged in a filter housing so as to be exchangeable, wherein the compact filter element comprises a filter body having a longitudinal axis.

For filtering air, so-called compact filters are widely used that are in particular comprised of layered filter paper. An undulated filter paper web is applied to a flat filter paper web. The semi-finished product produced in this way is wound to a filter body or stacked so that a plurality of parallel extending gas channels will result. These gas channels are alternately closed off by plugs. Incoming air flows from the raw (unfiltered air) side of the filter into the gas channels that are open at the inlet side and is forced, as a result of the plugs at the outlet side, to pass through the filter walls into the neighboring gas channels. From here, the filtered air flows through the gas channels at the outlet side to the pure (filtered air) side of the filter.

By means of the aforementioned construction air filters of a very compact configuration can be produced. Depending on the available space, the wound body or the stacked body and thus the filter as a whole can be designed to be flat with a narrow side and a long side. Tight mounting spaces can make it necessary to provide an asymmetric inflow in which the inlet opening, particularly in the area of the narrow side, is positioned with angular or positional displacement relative to the longitudinal axis of the filter body. The incoming air carries dust particles or the like that as a result of their inertia are not deflected as desired in a direction parallel to the gas channels. As a result of their inertia the dust particles are carried with increased concentration to the wall area of the filter housing that is opposite the inlet opening. As a result of this, dust loading of the compact filter element results that is minimal near the inlet opening and that increases toward the remote side. This non-uniform dust loading causes individual areas of the filter body to clog prematurely so that the filter performance decreases. The potential service life of the compact filter is not completely exploited.

It is an object of the present invention to develop a compact filter of the aforementioned kind in such a way that the uniformity of dirt loading across the base surface of a filter element is improved.

SUMMARY OF THE INVENTION

In accordance with the present invention, this object is achieved in that the compact filter element at its unfiltered air side has a baffle element that is removable together with the filter element from the filter housing and has at least one slanted baffle surface that is slanted relative to the longitudinal axis.

A compact filter, particularly a compact air filter for motor vehicles, is proposed that has a compact filter element that is arranged in a filter housing so as to be exchangeable wherein the compact filter element comprises a filter body with longitudinal axis. The compact filter element has at the unfiltered air side a baffle element that can be removed together with the filter element from the filter housing and the baffle element has at least one baffle surface that is slanted relative to the longitudinal axis. The baffle element can be clipped on the filter body loosely or with clamping action and is preferably fixedly connected thereto, for example, by direct injection molding onto a plastic part that is connected to the element. It can also be connected by gluing, by laying in foam or the like. By a suitable design of the baffle element the incoming dust-laden air flow is subjected to deflection at least approximately in a direction that is parallel to the longitudinal axis of the filter body or its air channels. The dust particles entrained by the air flow are forced to follow this deflection. In this way, a more uniform dust loading of the filter body is achieved. The useful service life is increased. The attachment of the baffle element on the filter body exerts a stabilizing effect on the filter body. It can be handled more easily when servicing the filter. The installation and removal are simplified. Moreover, an exact positional alignment of the baffle element relative to the filter body is ensured so that precisely defined intake conditions with uniform dust loading will be permanently maintained even after the compact filter element has been changed. The user is forced to change the baffle element together with the filter body so that damage, wear or excessive soiling cannot remain unnoticed.

In an advantageous further embodiment, an end of the baffle element at the downstream side adjoins an end face of the filter body at the intake side approximately in the area of its longitudinal axis wherein an upstream end of the baffle element is positioned approximately at a position of the intake surface area of the filter housing that is to be defined. In this way, the incoming air flow is divided into two partial streams. The entrained dust quantity is also divided in the same way into two partial quantities and is uniformly distributed across two partial surface areas of the filter body at least in approximation. Essentially the same can hold true for a larger number of baffle elements that divide the incoming air flow and the entrained dust quantity into a corresponding number of approximately identically sized partial streams and distribute it onto approximately same size surface areas of the filter body. The uniformity of the dust loading of the filter body is significantly improved even in the case of intake conditions with distinctive asymmetry. However, the distribution into partial streams can also be done so as to be non-uniform.

In a preferred embodiment, the baffle element is a curved plate. At high efficiency of the flow deflection a minimal flow resistance with minimal effect on the total flow resistance of the compact air filter results. The configuration as a curved plate leads to a minimal sensitivity in regard to abrasion caused by impacting dust particles.

In an expedient alternative, the baffle element has two baffle surfaces positioned at a spacing to one another; their spacing in the flow direction of the medium to be filtered narrows from an intake spacing to a minimal spacing. In addition to the afore described deflection function this arrangement also has an acoustic function. The spacing that narrows in the flow direction acts as a muffler for intake noise. In an expedient further embodiment, the spacing of the baffle surfaces in the flow direction of the medium widens from the minimal spacing to an the exit spacing. In this way, a diffuser is formed that, while maintaining the sound damping function, compensates the pressure loss in the area of the minimal spacing at least approximately. The flow resistance is minimized.

The arrangement according to the invention can be used effectively in a plurality of intake flow conditions of the compact filter. Preferred is a use in arrangements in which the intake opening of the filter housing with its center axis has a lateral displacement and/or angular displacement relative to the longitudinal axis of the filter body. In particular, the base surface of the filter body has a narrow side and a long side wherein the intake opening is arranged in the area of the narrow side. This provides a distinct effectiveness of the baffle element with which in particular a pronounced tendency for non-uniform dust loading is compensated with high efficiency.

BRIEF DESCRIPTION OF THE DRAWINGS

Embodiments of the invention with be explained in the following with the aid of the drawing in more detail.

DESCRIPTION OF THE PREFERRED EMBODIMENTS

Figure 1:
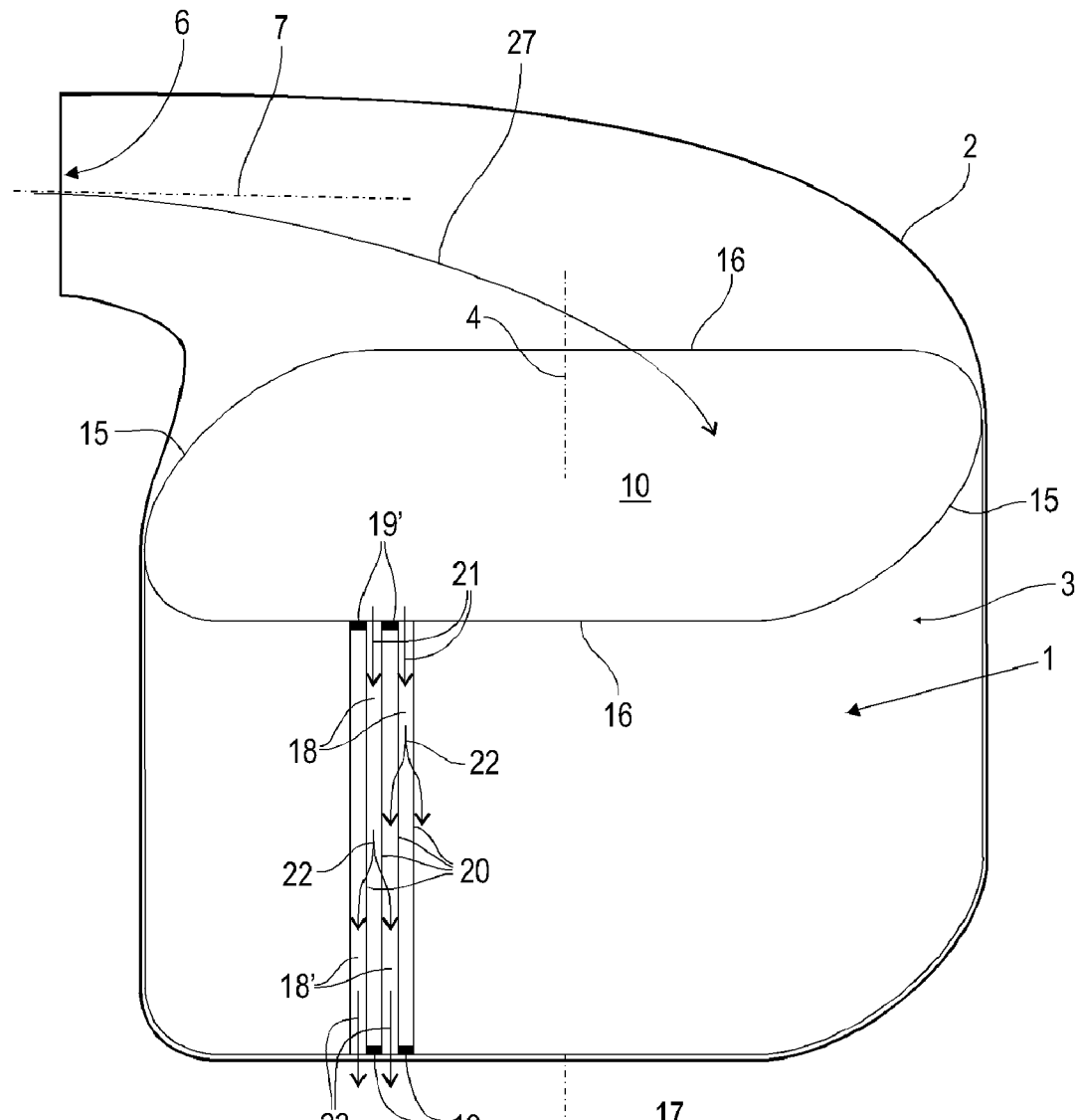
FIG. 1 shows in a schematic perspective view a compact filter with details of the flow conditions without baffle element.

FIG. 1 shows in a perspective illustration a compact filter that is designed as a compact air filter for a motor vehicle. However, other applications particularly in the area of gas and air filtration are conceivable. The compact filter comprises a compact filter element 1 with a filter body 3 and a schematically indicated filter housing 2. The filter housing 2 can be separated in a way not illustrated in detail in order to be able to change the compact filter element 1 at certain service intervals. The filter body 3 is comprised of filter paper wherein alternatingly flat and undulated filter paper webs are stacked on one another. The filter body 3 is formed by winding, stacking or folding such semi-finished products. The alternatingly adjoining undulated and flat filter paper webs generate as a result of their layer sequence a plurality of gas channels 18, 18' that extend parallel to a longitudinal axis 4 of the filter body 3. The filter body 3 is almost completely penetrated by gas channels 18, 18'. In order to facilitate the drawing, only a few gas channels 18, 18' are indicated in the schematic longitudinal section illustration as a schematic.

Neighboring gas channels 18, 18' are alternately closed by plugs 19, 19'. Each inflow gas channel 18 that is closed off by a plug 19 at its end adjoining the pure (filtered medium) side 17 is located adjacent to an outflow gas channel 18' that is closed off at its end facing the raw (unfiltered medium) side of the compact filter element with a plug 19'.

The filter housing 2 has an intake opening 6 with a central axis 7. Through the intake opening 6 dust-laden air flows in accordance with arrow 27 to the raw side 10 of the compact filter element 1. At this location, the dust-laden air enters the open gas channels 18 of the intake side as indicated by arrows 21. The air flow at the intake side is retained at the plugs 19 at the outlet side. The inlet gas channels 18 and the outlet gas channels 18' are separated from one another by filter walls 20 of filter paper. As a result of the aforementioned retaining effect the air flow at the intake side passes in accordance with arrows 22 through the filter walls 20 and enters the outflow gas channels 18'. In doing so, the air passing through is purified by removal of the dust particles and exits as clean air in accordance with arrows 23 from the outlet gas channels 18' at the outflow end face of the filter body 3 at the pure (filtered medium) side 17 of the filter. The plugs 19' at the intake side prevent return flow to the raw side 10.

For explaining the flow conditions, the compact filter is illustrated in FIG. 1 without the baffle elements 5 according to the invention which baffle elements will be explained in more detail in connection with FIGS. 2 and 3. The filter body 3 has an elongate contour with narrow sides 15 and long sides 16. The long sides 16 are for example more than twice as long as the narrow sides 15 so that a length ratio $\geqq 2$ exists. In the area of the narrow side 15, above the filter body 3, an intake opening 6 is arranged at the raw (unfiltered air) side 10. Its central axis 7 extends approximately parallel to the long sides 16, i.e., approximately perpendicularly to the longitudinal axis 4 of the compact filter element 1. The incoming air flow is indicated by arrow 27 that extends at an angle that is considerably greater than 0 E relative to the longitudinal axis 4. Without the baffle elements 5 illustrated in FIGS. 2 and 3 the dust entrained by the incoming air (arrow 27) is carried as a result of its inertia at increased concentration to the narrow side 15 that is opposite the intake opening 6. Without additional measures, an increased dust load will result at this location while in the area of the narrow side 15 adjoining the intake opening 6 the dust load of the filter body 3 is considerably less.

Figure 2:
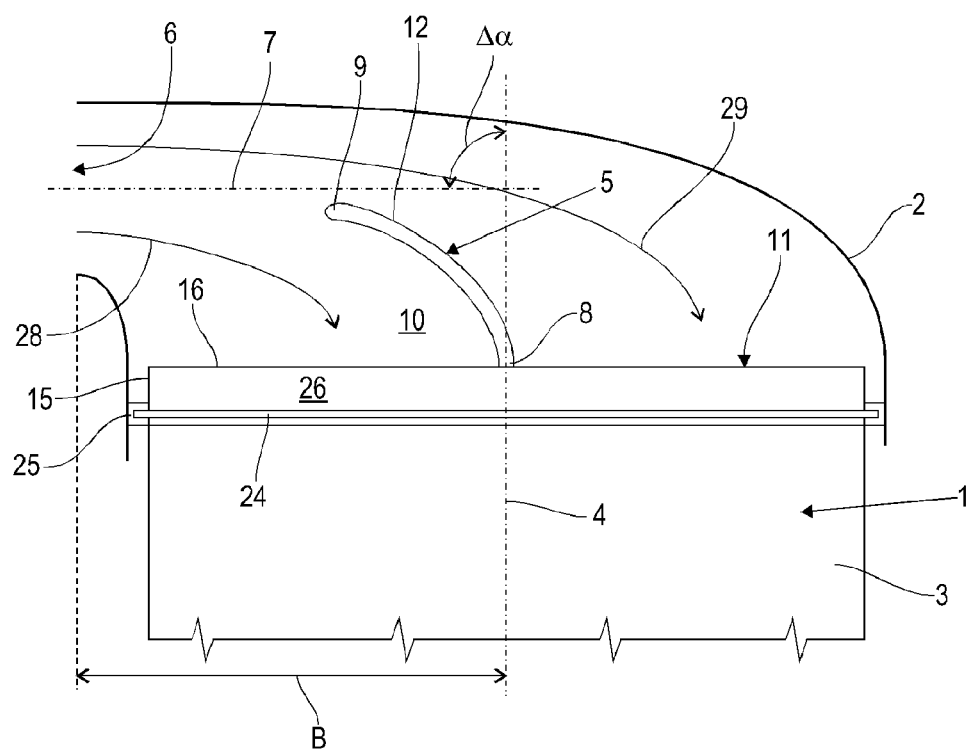
FIG. 2 is a schematic side view of an embodiment of the invention with a baffle element in the form of a curved plate.
Figure 3:
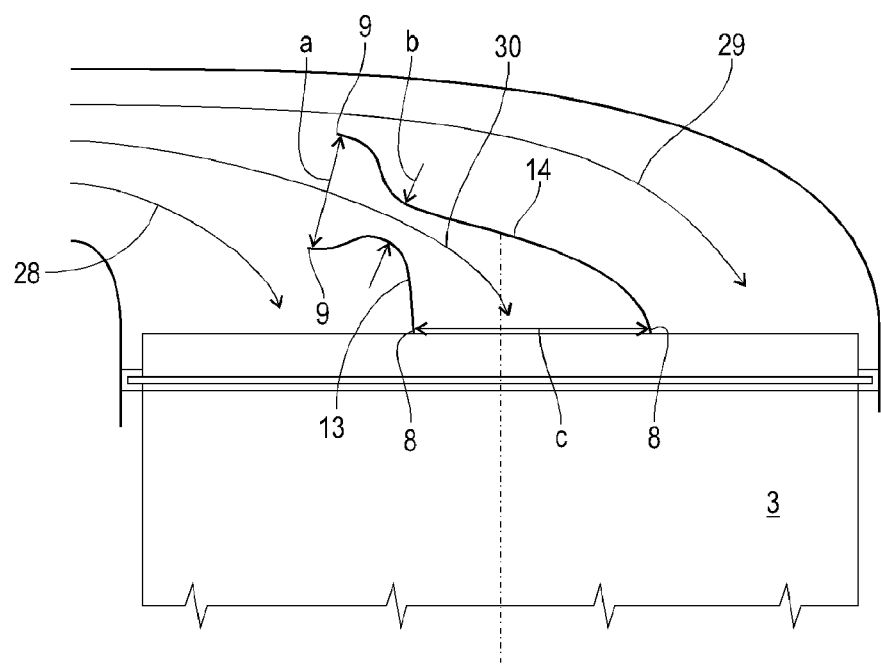
FIG. 3 is a variant of the arrangement according to FIG. 2 with two baffle surfaces forming a diffuser.

FIGS. 2 and 3 show in schematic side views embodiments of the invention where the compact filter according to FIG. 1 is provided with a baffle element 5, respectively. If not indicated otherwise, the examples according to FIGS. 2 and 3 are identical with regard to their features and reference numerals as well as in regard to features and reference numerals of the embodiment of FIG. 1. FIG. 2 shows in a representative fashion also for the other embodiments that the intake opening 6 of the filter housing 2 with its central axis 7 has a lateral displacement B relative to the longitudinal axis 4 of the filter body 3. This displacement B is approximately half the length of the long side 16 but can be of any other size. Moreover, the central axis 7 of the intake opening 6 relative to the longitudinal axis 4 of the filter body 3 has an angular displacement)∀ that in the illustrated embodiment is approximately 90 E. However, a deviating, particularly smaller, angular displacement)∀ can be provided that is in a range of 30 E inclusive up to 90 E inclusive, preferred 45E inclusive up to 90 E inclusive, and in particular in a range of 60 E inclusive up to 90 E inclusive. The lateral displacement B relative to the longitudinal axis 4 can be zero but is advantageously at least one fourth, expediently at least one third and in particular approximately half the length of the longitudinal side 16, or more.

The baffle element 5 has a baffle surface 12 that is inclined relative to the longitudinal axis 4 toward the central axis 7 and, in the illustrated embodiment, is formed as a curved plate. The downstream end 8 of the baffle element 5 in the flow direction adjoins an inflow end face 11 of the filter body 3 at the intake side (raw side) 10 at least approximately in the area of its longitudinal axis 4. The upstream end 9 of the baffle element 5 is configured as an aerodynamically rounded edge and is positioned approximately on or at least near the central axis 7 of the intake opening 6. It can be expedient to shorten the baffle element 5 relative to the illustration of FIG. 2 wherein the upstream edge or upstream end 9 is positioned at a greater spacing relative to the central axis 7 of the intake opening. The downstream end 8 of the baffle element 5 can have a preset spacing from the inflow end face 11 of the filter body 3. In any case, in the side view according to FIG. 2 the curved centerline of the baffle element 5 (centerline is not illustrated) in an imaginary extension should however closely follow approximately the central axis 7 and the longitudinal axis 4.

Because of the aforementioned design of the baffle element 5 with the baffle surface 12 the incoming air flow is divided into two partial streams in accordance with the arrows 28, 29. It can be seen that these two partial streams approximately have the same quantity or volume. By means of the downstream end 8 of the baffle element 5 arranged in the area of the longitudinal axis 4, the end face 11 of the filter body 3 is divided also into two partial surface areas having approximately the same size. The division can also be such that other dividing ratios exist. The two partial streams 28, 29 each carrying approximately the same dust load are at least approximately uniformly distributed onto the inflow end face 11 of the filter body 3 so that dust loading of the filter body 3 relative to its base surface or inflow end face 11 is at least approximately equalized.

The illustration according to FIG. 2 also shows that the compact filter element 1 has a seal support 24 extending circumferentially about the filter body 3 on which a circumferential seal 25 is attached for sealing the filter body 3 relative to the filter housing 2. Moreover, the compact filter element 1 at the unfiltered side 10 has a circumferentially extending knock protection 26 made from soft or hard plastic material or foamed material that together with the seal support 24 and the seal 25 is fixedly connected by gluing, laying in foam or the like to the filter body 3. It can be expedient to attach the baffle element 5 by clipping it on the knock protection 26 or on the seal support 24, for example, by means of an appropriate frame. Preferably, the baffle element 5 is fixedly connected and in particular non-detachably connected to the filter body 3; this can be realized, for example, by gluing or common laying in foam with the knock protection 26 and/or the seal support 24. When servicing the compact filter, the filter housing 2 is opened and then the compact filter element 1 and the baffle element 5 are removed and changed together as an assembly because the baffle element 5 is attached to the filter body 3.

FIG. 3 shows a variant of the arrangement of FIG. 2 in which the baffle element 5 has two baffle surfaces 13, 14 that are positioned at a spacing to one another. In the area of their upstream ends 9, the two baffle surfaces 13, 14 have an intake spacing a that is designed such that the incoming air flow is divided into three partial streams 28, 29, 30 that are at least approximately identical in size. Starting at the intake spacing a the spacing between the baffle surfaces 13, 14 decreases in the flow direction to a minimal spacing b that acts as a noise damping device (muffler) for intake noise. Father in the flow direction in accordance with arrow 30, the spacing between the baffle surfaces 13, 14 increases again until at the downstream end 8 or adjacent to the end face 11 of the filter body 3 a greater exit spacing c is provided. In this way, the two baffle surfaces 13, 14 form downstream of the minimal spacing b a diffusor for recovery of pressure losses in the area of the minimal spacing b. The baffle surfaces 13, 14 are aerodynamically rounded in order to prevent flow separation. Comparable to the function of a venturi section, this configuration provides a uniform turbulence-free flow directed onto the filter body 3.

In the embodiments according to FIGS. 2 and 3 the baffle surfaces 12, 13, 14 are curved one-dimensionally in accordance with their side view, i.e., they extend straight in a direction perpendicular to the plane of the drawing or parallel to the narrow sides 15. However, embodiments with three-dimensional curvature can also be expedient.

The clip-on connection of the filter element on the baffle element also provides the possibility of integrating a diffusor without additional expenditure.

While specific embodiments of the invention have been shown and described in detail to illustrate the inventive principles, it will be understood that the invention may be embodied otherwise without departing from such principles.

What is claimed is:

1. A compact filter comprising:
    a filter housing;
    a compact filter element that is arranged in said filter housing and so as to be exchangeable;
    wherein said compact filter element comprises a filter body having a longitudinal axis;
    wherein said compact filter element has an unfiltered medium side and a filtered medium side;
    a baffle element arranged at said unfiltered medium side of said compact filter element;
    wherein said baffle element is removable together with said compact filter element from said filter housing and has at least one baffle surface that is slanted relative to said longitudinal axis; and
    wherein said baffle element is fixedly attached to said filter body.

2. The compact filter according to claim 1, wherein said baffle element has a downstream end and an upstream end relative to a flow direction of a medium to be filtered, wherein said downstream end adjoins an end face of said filter body at an intake side of said filter body approximately in an area of said longitudinal axis, wherein said upstream end is located approximately on a center axis of an intake opening of said filter housing.

3. The compact filter according to claim 1, wherein said baffle element is a curved plate.

4. The compact filter according to claim 1, wherein said filter housing has an intake opening having a center axis,
    wherein said intake opening has a lateral displacement relative to said longitudinal axis.

5. The compact filter according to claim 1, wherein said filter housing has an intake opening having a center axis,
    wherein said center axis has an angular displacement relative to said longitudinal axis.

6. The compact filter according to claim 1, wherein said filter housing has an intake opening having a center axis,
    wherein said intake opening has a lateral displacement relative to said longitudinal axis and
    wherein said center axis has an angular displacement relative to said longitudinal axis.

7. The compact filter according to claim 1, wherein said filter body has a narrow side and a long side,
    wherein a length ratio of said narrow side and said long side is >2,
    wherein an intake opening of said filter housing is arranged in an area of said narrow side.

8. The compact filter according to claim 1, wherein said filter body is comprised of a zigzag-folded, concentrically constructed filter medium,
    wherein said filter body has an inflow end face and an outflow end face,
    wherein said filter element further comprises terminal disks arranged on said inflow end face and said outflow end face.

9. The compact filter according to claim 1, wherein said filter body is comprised of a zigzag-folded filter medium comprising filter pockets that extend in the inflow and outflow end faces in the inflow and outflow direction.

10. A compact filter comprising:

a filter housing;

a compact filter element that is arranged in said filter housing and so as to be exchangeable;

wherein said compact filter element comprises a filter body having a longitudinal axis;

wherein said compact filter element has an unfiltered medium side and a filtered medium side;

a baffle element arranged at said unfiltered medium side of said compact filter element;

wherein said baffle element is removable together with said compact filter element from said filter housing and has at least one baffle surface that is slanted relative to said longitudinal axis, wherein said baffle element has two of said at least one baffle surface and wherein said two baffle surfaces are positioned at a relative spacing to one another, wherein said relative spacing decreases from an intake spacing to a minimal spacing in a flow direction of a medium to be filtered.

11. The compact filter according to claim 10, wherein said relative spacing increases in said flow direction from said minimal spacing to an exit spacing.

12. The compact filter according to claim 10, wherein said two baffle surfaces define a round or oval cross-section and are utilized for acoustic adjustment and acoustic optimization.

13. A compact filter comprising:

a filter housing;

a compact filter element that is arranged in said filter housing and so as to be exchangeable;

wherein said compact filter element comprises a filter body having a longitudinal axis;

wherein said compact filter element has an unfiltered medium side and a filtered medium side;

a baffle element arranged at said unfiltered medium side of said compact filter element;

wherein said baffle element is removable together with said compact filter element from said filter housing and has at least one baffle surface that is slanted relative to said longitudinal axis, wherein said filter body is comprised of a zigzag-folded, concentrically constructed filter medium, wherein said filter body has an inflow end face and an outflow end face, wherein said filter element further comprises a terminal disk that is arranged on said inflow end face or said outflow end face.

* * * * *